United States Patent [19]

Yamashita

[11] Patent Number: 4,649,306

[45] Date of Patent: Mar. 10, 1987

[54] DIRECT DRIVE MOTOR HAVING ADJUSTABLE BEARING FOR SPINDLE

[75] Inventor: Tatsumaro Yamashita, Funaokani, Japan

[73] Assignee: Alps Electric Co., Ltd., Japan

[21] Appl. No.: 785,525

[22] Filed: Oct. 8, 1985

[30] Foreign Application Priority Data

Oct. 8, 1984 [JP] Japan .............................. 59-152177[U]

[51] Int. Cl.⁴ .............................................. H02K 5/16
[52] U.S. Cl. .................................. 310/90; 74/571 M; 360/90; 384/246; 384/248
[58] Field of Search ................... 310/90, 156; 384/245, 384/246, 441, 240, 243, 244, 248; 360/90, 93; 74/570, 571 M

[56] References Cited

U.S. PATENT DOCUMENTS

| | | | |
|---|---|---|---|
| 1,371,022 | 3/1921 | Ecaubert | 384/246 |
| 1,385,400 | 7/1921 | Scheibe | 384/246 |
| 1,458,658 | 6/1923 | Leich | 384/246 |
| 3,020,104 | 2/1962 | Nichols | 384/246 |
| 4,181,867 | 1/1980 | Muller | 310/156 |
| 4,357,550 | 11/1982 | Müller | 310/90 |

*Primary Examiner*—Patrick R. Salce
*Assistant Examiner*—D. L. Rebsch
*Attorney, Agent, or Firm*—Guy W. Shoup

[57] ABSTRACT

A direct drive motor is disclosed comprising a base, an upright housing mounted on the base provided with bearings at the upper and lower end portions, and a capstan spindle held by the bearings, wherein one of the bearings is fitted screw-displaceably in the upper portion of said housing and provided with a hole receiving the upper end portion of the capstan spindle, held rotatably therein in both radial and thrust directions.

2 Claims, 7 Drawing Figures

DIRECT DRIVE MOTOR HAVING ADJUSTABLE BEARING FOR SPINDLE

BACKGROUND OF THE INVENTION

1. Field of the Invention

This invention relates to a direct drive motor, particularly for use in the capstan spindle of a tape player.

2. Description of the Prior Art

Recently there has been a tendency of tape players and VTRs toward miniaturization and lightening. The application of a direct drive motor to a capstan spindle has been used for this purpose.

FIG. 7 is an elevational view of an example of such a prior art direct drive motor driving a capstan spindle of a tape player for feeding a tape. The capstan spindle is held at the upper and lower end portions by bearings 2,2. The bearings 2,2 are force-fitted in an upright housing 4 mounted on a base 3. To the bottom 1a of the capstan spindle 1, a rotor 5 is secured through a boss 6. The rotor carries a set of magnets 7, 7. the above-mentioned base 3 is provided on the underside with a yoke 9 and a set of coils 8, 8 opposite to the magnets 7, 7.

The capstan spindle 1 abuts at its upper end 1b against a thrust plate 11 made of a low friction material. The thrust plate 11 is fitted in the bottom with a screw 10 screwed in the upper end of the housing 4. The upward (in the drawing) force applied to the capstan spindle 1 resulting from the magnetic force of attraction between the magnet 7 and the coil 8 is countered by the abutment of the upper end (1b) of the capstan spindle 1 against the thrust plate 11 in the thrust direction. The mechanism enables adjustment of the gap between the magnets 7 and coils 8 by turning the screw 10 accompanied by the vertical displacement of the thrust plate 11.

The capstan spindle 1 is exposed through an opening 4a formed on one side of the housing 4. The exposed portion is opposite to a pinch roller to be abutted against it. The prior art direct drive motor mentioned above has the following defects or disadvantages:

(1) The capstan spindle 1 is, at the upper end 1b, held in the radial direction by the bearing 2 and in the thrust direction by the thrust plate 11. This design requires a number of parts for holding the upper end 1b of the capstan spindle, which complicates the assembly and adds a correspondingly-higher cost. The separate attachment of the screw 10 and the upper bearing 2 contributes to the added height of the product which hinders miniaturization.

(2) The bearings 2, 2 are forced-fitted in the upper and lower end portions of the housing 4 respectively, so as not to allow radial movement. This requires highly precise assembly to ensure the accurate setting of which is more complicated hence, involving complicated work.

OBJECT AND SUMMARY OF THE INVENTION

It is the principal object of the invention to provide a direct drive motor which can be minaturized due to reduced height, lightened due to reduced parts, manufactured without highly precise bearing tolerance requirements and assembled simply.

A direct drive motor according to the invention comprises a base, an upright housing mounted on said base provided at the upper and lower end portions with bearings, a capstan spindle held by said bearings, a rotor fixedly attached to the bottom of said capstan spindle and having a set of magnets thereon, and a set of coils disposed on the underside of said base opposite to said magnets, wherein one of said bearings is screw member threaded displaceably in the upper portion of said housing and provided with a hole receiving the upper end portion of said capstan spindle for holding it in both radial and vertical thrust directions rotatably.

DESCRIPTION OF THE PREFERRED EMBODIMENTS

The invention will be described more fully by examples with reference to the accompanying drawings.

Figure 1:
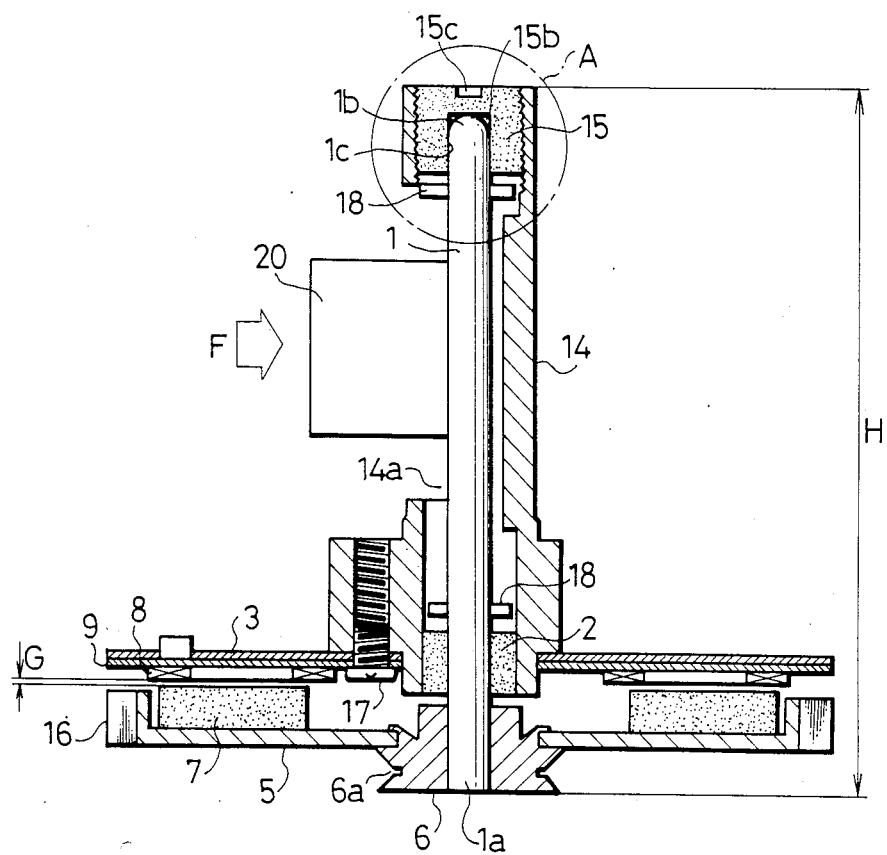
FIG. 1 is an elevational view of a direct drive motor in accordance with the invention used in a tape player.
Figure 2:
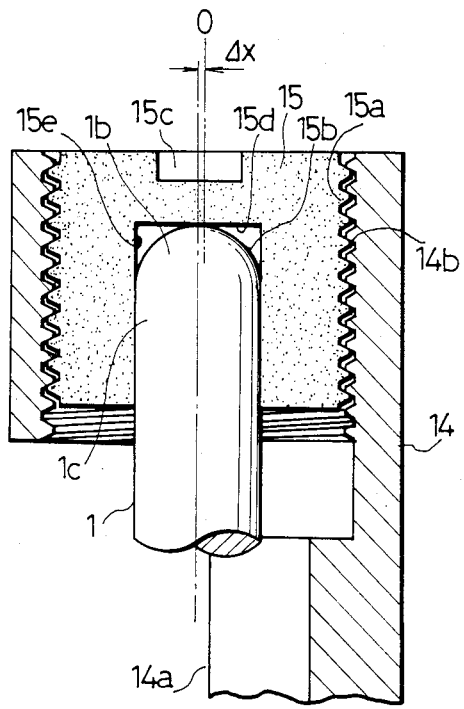
FIGS. 2 and 3 are similar enlarged views of part A of the same direct drive motor in different states of operation, respectively.

In FIG. 1 a reference character 3 designates a base provided in a tape player, on which a housing 14 is mounted in the upright standing position. The housing 14 is provided on one side with a bored opening 14a, through which a pinch roller 20 is disposed (see FIG. 6). The housing 14 has at the bottom of force-fitted bearing 2. The lower bearing 2 holds a capstan spindle mounted upwardly therethrough. The capstan spindle 1 has at the base a boss 6 secured thereto. The boss is provided with a groove 6a to serve as a pulley having thereon a belt for transmitting the rotation power of the capstan spindle 1 to another rotation mechanism (not shown).

The boss 6 carries a rotor 5 firmly mounted concentrically in relation to the axis of the capstan spindle 1. A set of magnets 7, 7 are mounted on the rotor 5 likewise concentrically so that their N poles and S poles are arranged alternately in relation to the circumferential direction. The rotor 5 may also have on the periphery magnets which are detected for measuring rotation speed.

Above and opposite to the magnets 7, 7 are coils 8, 8 attached to the base 3 through a magnetic yoke 9 secured to the underside by screws 17. The screws concomitantly secures the housing 14 to the base 3. The coils 8, 8 are arranged at regular intervals circumferencially in relation to the capstan spindle 1, and wound in triangular sections having winding axes parallel to that of the capstan spindle 1.

The upper end portion of the housing 14 has an internal screw thread cut 14b, in which a bearing 15 provided with screw threads 15a is screwed. The bearing 15 is made of sintered alloy impregnated with oil. It has at one end a recess 15c in which the end of a screw driver may be inserted for adjustment, and a center hole 15b of a desired depth extending inward from the other end. The upper end portion of the capstan spindle 1 having the spherical end 1b is held slidably in the center hole 15b of the bearing 15 so that the spherical end of the capstan spindle 1 abuts on the hole bottom 15d and inner surface 15e.

Figure 4:
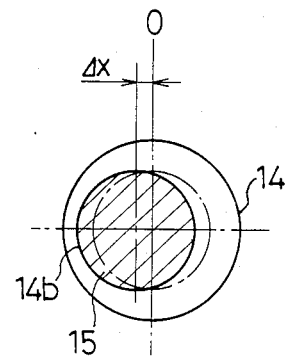
FIG. 4 is a plan view of the same direct drive motor.

As shown in FIG. 4, the center axis of the internal screw thread cut 14b has an eccentric spacing Δx toward the opening 14a from the center axis O of the housing 14. The eccentric spacing Δx corresponds to a certain amount of play between the internal screw thread 14b and the screw thread 15a of the bearing 15 (darkened area). The device performs the function that, when the capstan spindle undergoes pressure in the direction of arrow F by a pinch roller 20, the bearing 15 is displaced rightwards in FIG. 4, by the distance of above-mentioned play or eccentric spacing so that the bearing 15 and the other bearing 2 take a concentric relation to each other.

Figure 6:
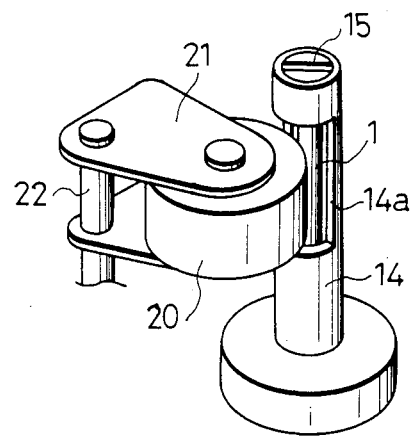
FIG. 6 is a perspective view of parts of the tape player responsible for feeding the tape.
Figure 7:
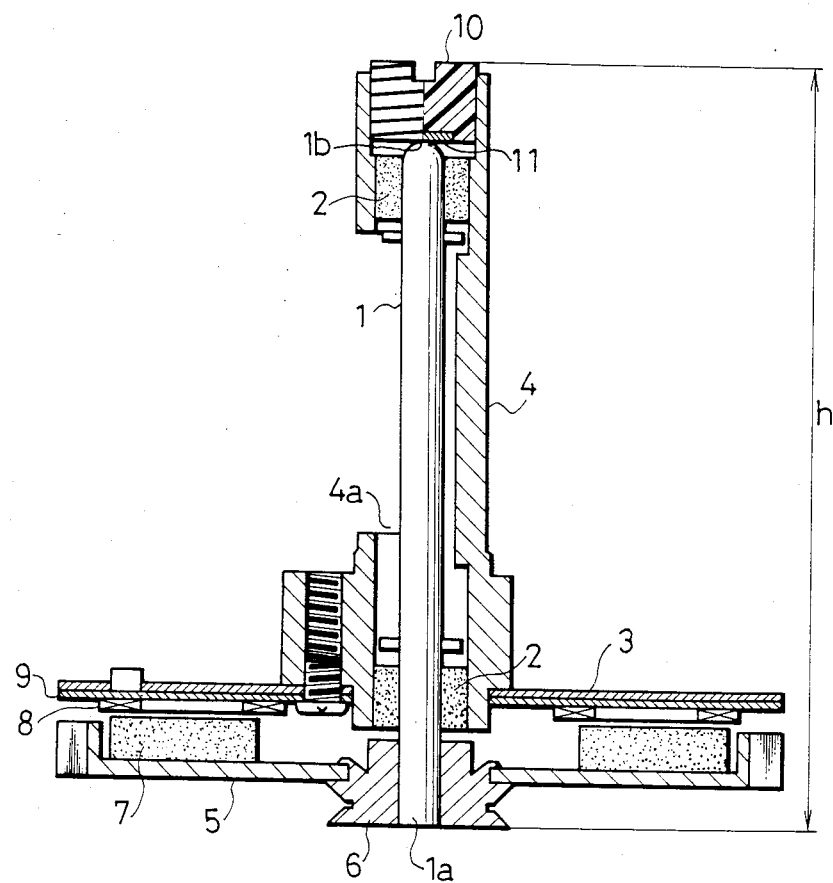
FIG. 7 is an elevational view of a prior art direct drive motor.

Referring to FIG. 6, the pinch roller 20 is rotatably held by the arm 21 of the holder consisting of a column 22 on the base. The arm 21 is urged by a spring so that the pinch roller 20 abuts against the exposed side portion of the capstan spindle 1.

Reference characters 18, 18 designate oil seals for preventing oil impregnated in the bearings 15, 2 from flowing out from the housing 14 through the opening 14a.

The operation of the direct drive motor of the above-mentioned structure will be described. The magnets 7, 7 and coils 8, 8 on the rotor 5 are interopposed and attract each other, whereby the capstan spindle 1 is subjected to an upward bias. For adjusting the gap between the magnets and coils, the bearing 15 is rotated clockwise or counterclockwise by a tool such as a screw driver with its wedge-shaped end entering the end recess 15c of the bearing 15, whereby the bearing is displaced along the axis of the housing 14, and as a result, the capstan spindle 1 abutting against the bottom 15d of the bearing hole 15b moves vertically to change the gap.

When voltage is applied to the coils, the resulting magnetic force imparts rotation to the rotor 5. As the result, the capstan spindle 1 is driven and at the same time the power is transmitted to other driven parts by a belt (not shown) in the groove 6a on the boss 6 serving as a pulley.

A magnetic tape is disposed opposite to the portion of the capstan spindle 1 exposed through the opening 14a of the housing 14. When sound is recorded or reproduced, the magnetic tape is driven by the pinch roller 20 urged by a spring against the capstan spindle 1.

Figure 3:
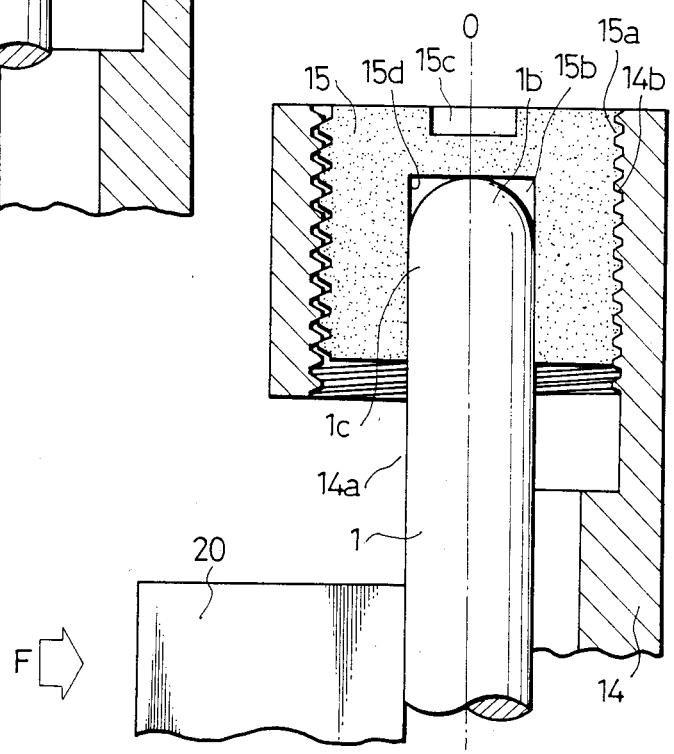

When the capstan spindle 1 is urged in the direction F by the pinch roller 20, the bearing 15 holding the upper end portion 1c of the capstan spindle 1 is displaced by the play between the external screw thread 15a and the internal screw thread 14b of the housing 14. The displacement, as above-described, is set to be equal to the deviation Δx between the center axis of the internal screw thread and the center axis O of the housing 14. As a result of the displacement under pressure by the pinch roller, the operational position shown displaced on the right side in FIG. 3, in which the screw thread 15a is partially brought into close contact with the internal screw thread 14b, corresponds to the upper and lower bearings 15, 2 becoming concentric with each other.

In this way, the capstan spindle 1 can be smoothly rotated while held in the radical direction against the wall 15e of the hole 15b in the bearing and the vertical thrust direction against the bottom 15d of the hole 15b.

The upper end portion of the capstan spindle 1 is fitted in the hole 15b of the bearing 15 to smoothly rotate such that the bearing does not concomitantly turn. After the concentric position has been attained by the displacement, the fixation of the bearing 15 against the internal screw threads 14b by clinching or adhesion does not hinder rotation of the spindle in the example according to the invention.

In addition, the direct drive motor has a height reduced by virtue of the integration of the screw bearing 15 having both radial and vertical thrust bearing functions.

Figure 5:
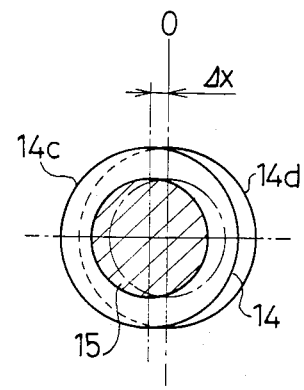
FIG. 5 is a similar plan view of an alternative embodiment according to the invention.

In an alternative example according to the invention illustrated in FIG. 5, the upper end portion 14c of the housing 1, including the internal screw thread 14b formed concentrically with it, is allowed to deviate by Δx with the pinch roller 20 from the lower portion. This design gives the same effect as in the above-described example.

The direct drive motors according to the invention can be used for 8 mm VTR and other apparatus.

The present invention has the following advantages:

(1) The housing uprightly mounted on the base holds at the upper end portion a bearing provided with an upward center hole in which the upper end portion of the capstan spindle is rotatable fitted, thus contributing to the curtailment of parts.

(2) Due to the curtailment of parts, not only lightening but also miniaturization due to reduced height is enabled compared to the prior art.

(3) The upper bearing fitted in threaded engagement in the housing is made displaceable relative to the housing, whereby easy adjustment of the gap between the coils and magnets is permitted. In addition, fine adjustment of the center axis of the upper bearing to be concentric with that of the lower bearing is enabled by virtue of the play between both interengaged parts. This enables the apparatus to be assembled without the severe tolerance requirements of the prior art.

What is claimed is:

1. In a direct drive motor comprising a base, an upright housing mounted on said base and provided with upper and lower bearings at its upper and lower ends, a capstan spindle rotatably mounted in said housing having upper and lower end portions fitted in said upper and lower bearings, respectively, said upright housing having an opening intermediate its ends for exposing said capstan spindle such that a pinch roller can be moved displaceably into contact with said capstan spindle at an operational position for driving a tape interposed therebetween, a rotor fixed to the lower end portion of said capstan spindle and having a plurality of magnets thereon, and a plurality of coils mounted on an underside of said base opposite to said magnets for driving said rotor when an electric current is applied to said coils, the improvement wherein said upper bearing is formed as a screw member having external threads on a peripheral surface thereof and a recess defined in its bottom for receiving the upper end portion of said capstan spindle smoothly rotatably therein, said upper end of said housing having an internally threaded hole for receiving said threaded upper bearing therein, and said threaded hole of said upper end of said housing having a small eccentric spacing offset from an axis coincident with the operational position of said capstan spindle in driving contact with said pinch roller, whereby said threaded upper bearing is threadably adjustable in an axial thrust direction of said capstan spindle, and at the same time provides a radial thrust bearing function when said capstan spindle is in driving contact with said pinch roller and said threaded upper bearing holding said capstan spindle is pressed frictionally against the threading of said hole at the operational position.

2. In a direct drive motor comprising a base, an upright housing mounted on said base and provided with upper and lower bearings at its upper and lower ends, a capstan spindle rotatably mounted in said housing having upper and lower end portions fitted in said upper and lower bearings, respectively, said upright housing having an opening intermediate its ends for exposing said capstan spindle such that a pinch roller can be moved displaceably into contact with said capstan spindle at an operational position for driving a tape interposed therebetween, a rotor fixed to the lower end portion of said capstan spindle and having a plurality of magnets thereon, and a plurality of coils mounted on an underside of said base opposite to said magnets for driving said rotor when an electric current is applied to said coils, the improvement wherein said upper bearing is formed as a screw member having external threads on a peripheral surface thereof and a recess defined in its bottom for receiving the upper end portion of said capstan spindle smoothly rotatably therein, and said upper end of said housing having an internally threaded hole for receiving said threaded upper bearing therein and being displaceably offset by a small eccentric spacing from an axis coincident with the operational position of said capstan spindle in driving contact with said pinch roller, whereby said threaded upper bearing is threadably adjustable in an axial thrust direction of said capstan spindle, and at the same time provides a dradial thrust bearing function when said capstan spindle is in driving contact with said pinch roller and said upper end of said housing holding said capstan spindle is pressed toward the operational position.

* * * * *